United States Patent
Schwank et al.

(10) Patent No.: US 7,913,683 B2
(45) Date of Patent: Mar. 29, 2011

(54) RADIANT TUBE HEATER

(75) Inventors: Bernd Schwank, Cologne (DE); Samer Hassan, Mississauga (CA); Yuri Kyrychynskyi, Toronto (CA); Tibor Virag, Etobicke (CA)

(73) Assignee: Schwank Ltd., Mississauga (CA)

( * ) Notice: Subject to any disclaimer, the term of this patent is extended or adjusted under 35 U.S.C. 154(b) by 715 days.

(21) Appl. No.: 11/831,130

(22) Filed: Jul. 31, 2007

(65) Prior Publication Data

US 2008/0178860 A1 Jul. 31, 2008

Related U.S. Application Data

(60) Provisional application No. 60/886,765, filed on Jan. 26, 2007.

(51) Int. Cl.
*F24H 3/00* (2006.01)
*F24H 3/02* (2006.01)

(52) U.S. Cl. .............. 126/104 A; 431/181; 431/353; 126/110 D

(58) Field of Classification Search .......... 126/104 A, 126/91 A, 109, 110 D, 39 R, 116 R; 431/242, 431/215, 7, 159, 181, 187, 353; 137/625.3, 137/625.31
See application file for complete search history.

(56) References Cited

U.S. PATENT DOCUMENTS

| | | | |
|---|---|---|---|
| 2,119,952 A | 6/1938 | Engels | |
| 2,964,103 A | 12/1960 | Ryder | |
| 3,042,105 A | 7/1962 | Bitterlich | |
| 3,187,740 A * | 6/1965 | Jones et al. | 126/91 A |
| 3,195,609 A | 7/1965 | Nesbitt | |
| 3,227,202 A | 1/1966 | Morgan | |
| 3,413,069 A | 11/1968 | Walsh | |
| 4,705,022 A | 11/1987 | Collier | |
| 4,762,487 A | 8/1988 | Zappa | |
| 4,766,877 A | 8/1988 | Jensen | |
| 5,224,542 A | 7/1993 | Hemsath | |
| 5,353,986 A * | 10/1994 | Wortman et al. | 237/2 R |
| 5,361,750 A | 11/1994 | Seel et al. | |
| 5,429,112 A | 7/1995 | Rozzi | |
| 5,975,887 A * | 11/1999 | Kamal et al. | 431/181 |
| 6,482,000 B2 | 11/2002 | Sestrap et al. | |
| 6,718,968 B2 * | 4/2004 | Cooley et al. | 126/110 C |
| 7,011,516 B2 * | 3/2006 | Aust et al. | 431/328 |
| 2004/0201487 A1 * | 10/2004 | Benson et al. | 340/666 |

FOREIGN PATENT DOCUMENTS

FR 0391818 A1 * 10/1910

* cited by examiner

*Primary Examiner* — Kenneth B Rinehart
*Assistant Examiner* — Chuka C Ndubizu
(74) *Attorney, Agent, or Firm* — Gifford, Krass, Sprinkle, Anderson & Citkowski, P.C.

(57) ABSTRACT

A radiant tube heater has a tubular arrangement with an air duct portion forming a combustion air passage and a radiant tube portion which is heated by and surrounds a laminar flame. An inlet end of the air duct portion receives combustion air from a blower. A burner assembly mounted in the air duct portion includes a burner nozzle and a burner head for mixing gas and combustion air, this head having an inlet portion and an outlet portion wider than the inlet portion. A perforated restricting plate is mounted in the air duct portion and extends around the burner head. Air holes in this plate are sized and distributed so that the plate increases flow of combustion air through openings formed in the side of the inlet portion and allows combustion air to flow in the annular passage between the outlet portion and the air duct portion.

18 Claims, 7 Drawing Sheets

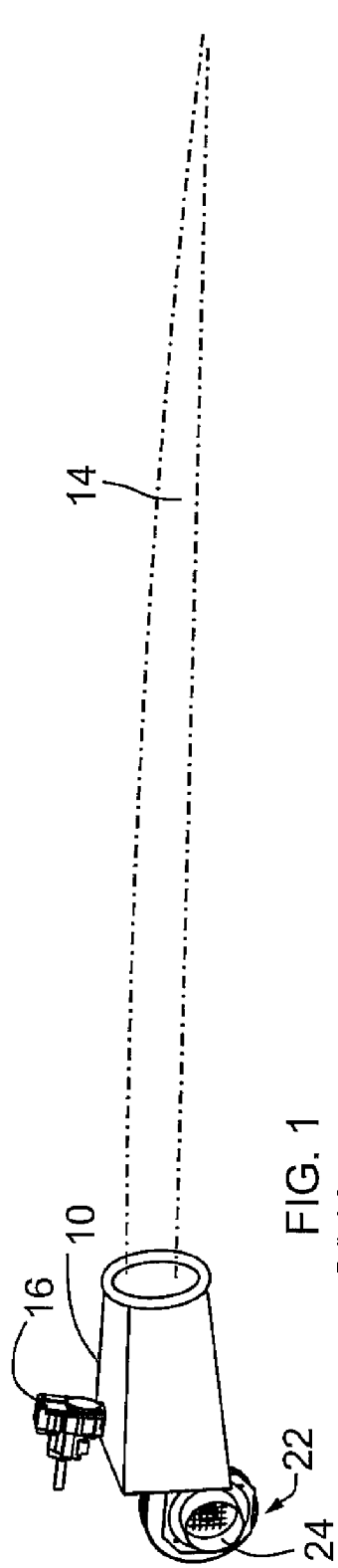
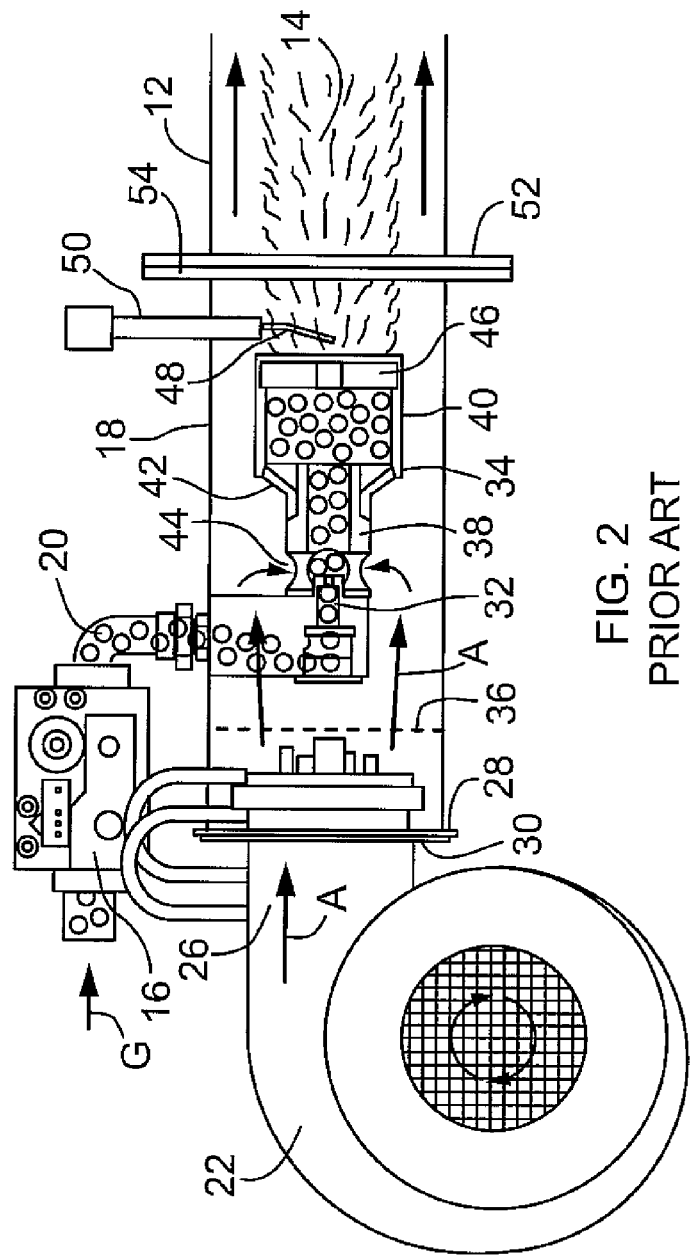
FIG. 1 PRIOR ART
FIG. 2 PRIOR ART

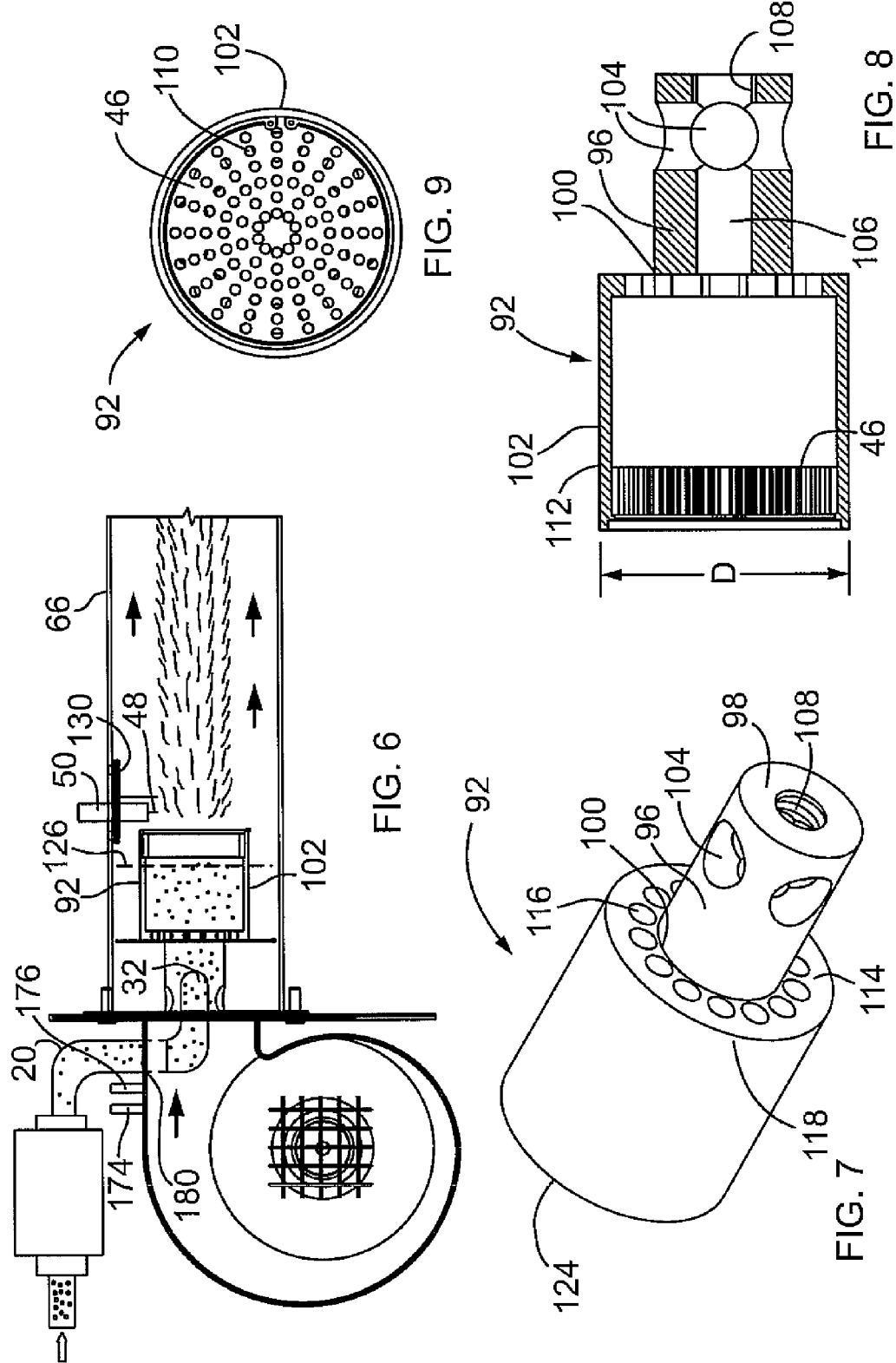

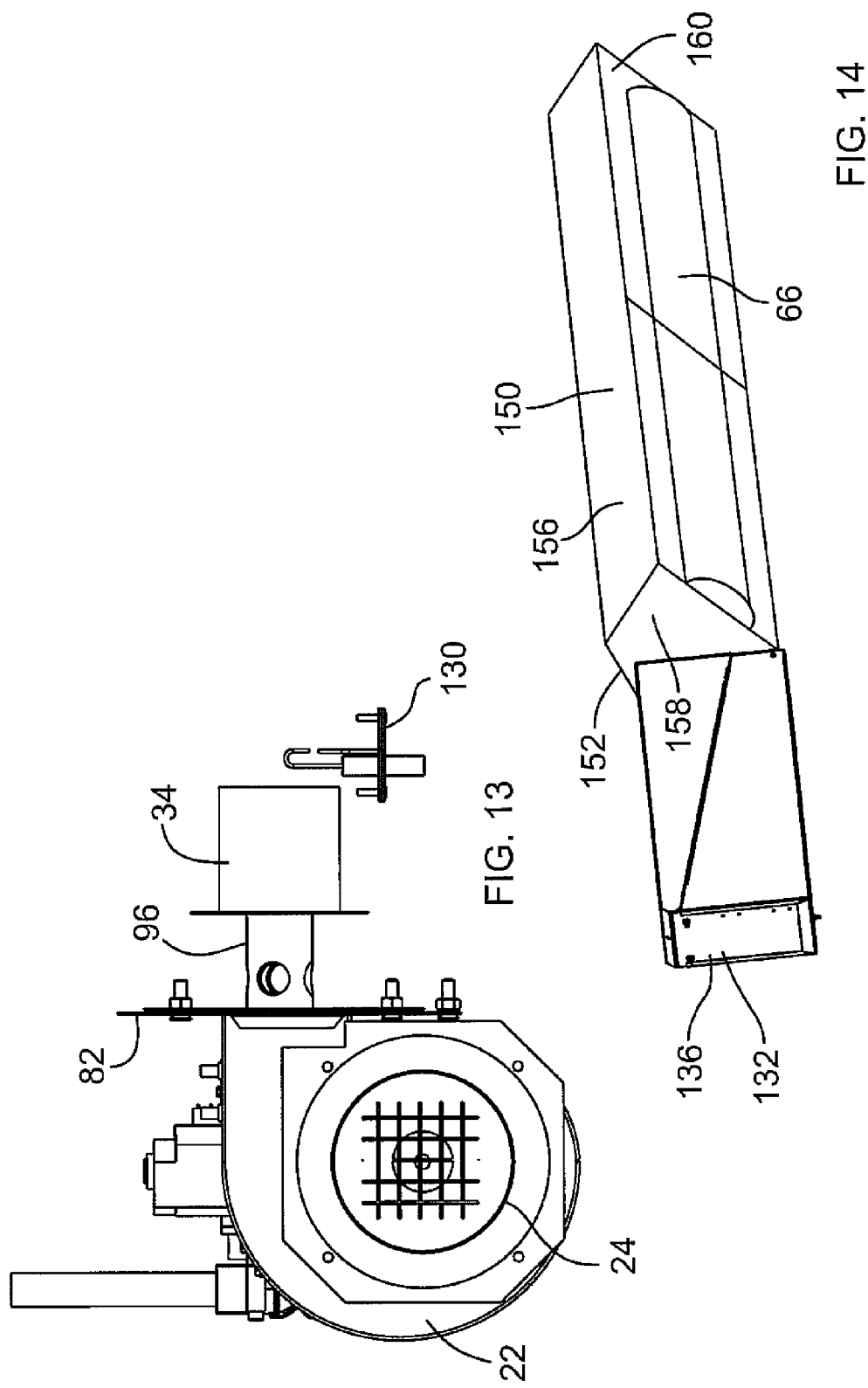

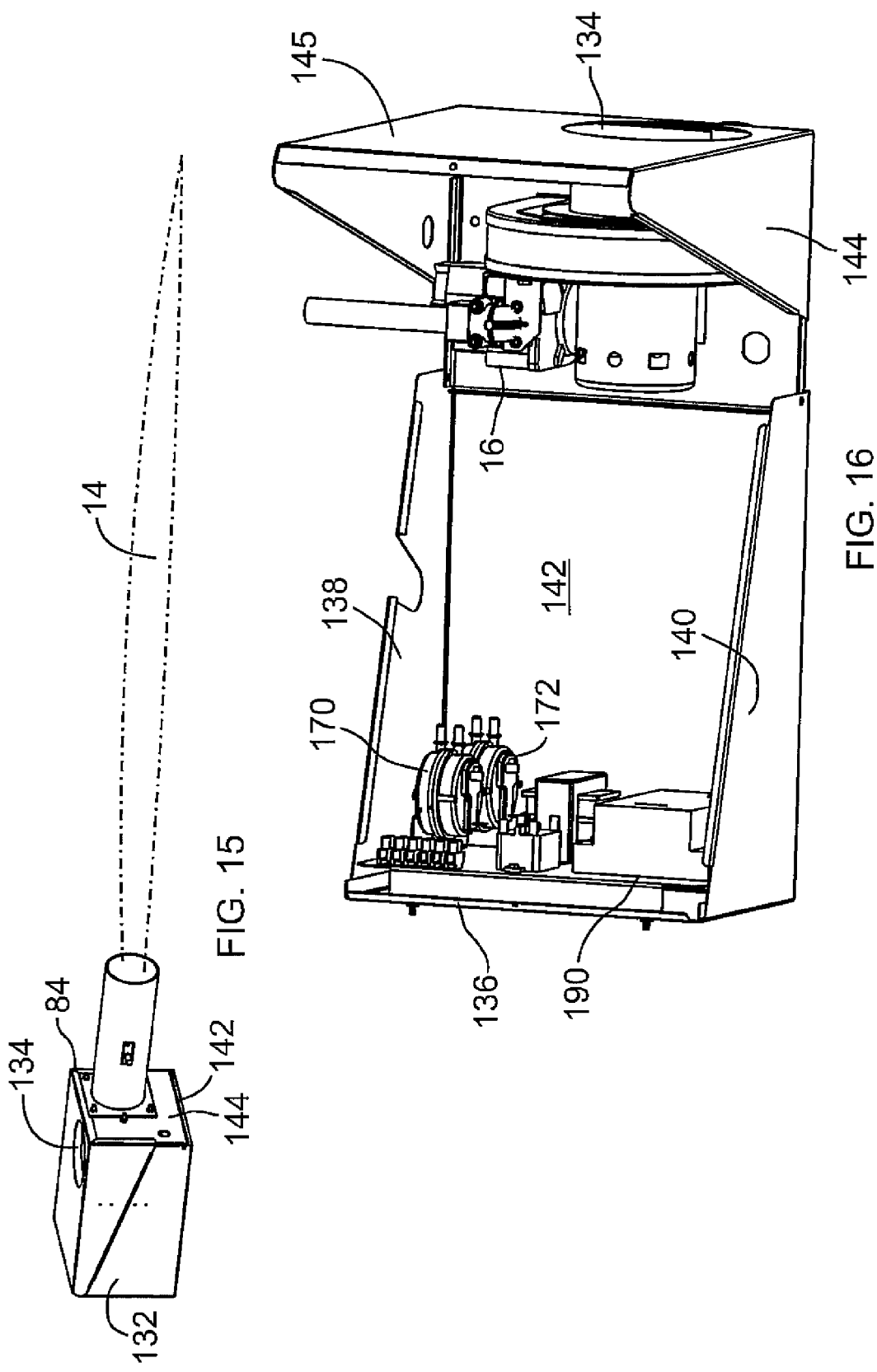

RADIANT TUBE HEATER

CROSS-REFERENCE TO RELATED PROVISIONAL APPLICATION

The present application claims domestic priority based on U.S. Provisional Patent Application No. 60/886,765 filed Jan. 26, 2007 and entitled "RADIANT TUBE HEATER".

BACKGROUND OF THE INVENTION

This invention relates to radiant tube heaters used for radiant heating and heater assemblies adapted for use with radiant tubes.

In some heating applications, such as high bay or high ceiling applications or outdoor applications, forced air heating is relatively impractical due to the fact that warm convective air rises leaving lower areas or regions where people are located relatively cold. In these other applications where such common air heating systems are not practical, it is known to use heaters which generate radiant energy, this energy being transmitted to objects such as floors, tools and machinery. The heated objects can store the warmth and re-radiate it to surrounding air. In this manner, radiant heating can provide warm, comfortable conditions where people are congregated and the use of such heating can avoid wasting convective heat and can lower energy costs.

One known type of radiant heater is a radiant tube heater which employs a relatively long, radiant tube made of a suitable metal, this tube surrounding and enclosing an elongate flame projected from a burner head. This heater includes a combustion air blower which can be of standard construction, a burner nozzle connected to a combustible gas supply, and the burner head connected to the nozzle. The nozzle and head form a burner assembly which is positioned in a combustion air duct section forming a passage for combustion air. The outlet end of the blower is attached to an inlet end of the air duct section so that the blower is able to direct combustion air through the air duct section which can include a perforated equalizer plate so that air flow is approximately evenly distributed across the width of the air duct section before the combustion air reaches the burner assembly. The burner head, which is arranged centrally in the air duct section, creates an annular passageway between itself and the air duct section. The burner head has a substantially cylindrical inlet portion of relatively small diameter, a substantially cylindrical outlet portion having a diameter substantially larger than the inlet portion and a frustoconical intermediate portion extending between the inlet portion and the outlet portion and through which combustion air can flow into the outlet portion. The combustible gas, which can be natural gas or LPG fuel, is delivered to the heater through a gas valve governor to the burner nozzle which is installed in the upstream end of the inlet portion. Combustion air enters through vents or ports in the side wall of the inlet portion to intermingle or mix with the fuel, thereby producing a gas/air mixture that exits through a perforated ceramic tile mounted in the downstream end of the outlet portion. The exiting mixture is ignited by an electrode resulting in a long laminar flame extending down the radiant tube, this flame being up to sixteen feet in length or more. An end of the cylindrical radiant tube is secured to and extends from the downstream end of the air duct section and is heated by the long flame to emit infrared radiant heat. Typically, the radiant tube is located in the top portion of a downwardly-opening, trough-shaped reflector/shield. The reflector or shield in use receives upwardly-directed radiant energy from the tube and reflects or re-radiates this energy downwardly to a desired location for heating purposes. This known heater is relatively quiet and reliable in operation and relatively inexpensive to manufacture. However, there is a desire to provide radiant tube heaters which are more efficient, particularly in view of the relatively high cost of heating gas.

One form of radiant tube heater is described and illustrated in U.S. Pat. No. 5,429,112 which issued Jul. 4, 1995 to M. Rozzi. This heater has a housing and a radiant tube mounted within the housing along with a modular control box. The tube is made from aluminum coated steel such as that sold under the trade-mark "ALUMA-THERM". A first open end of the tube is connected to an internal wall formed with a hole to receive the tube. The second open end of the tube protrudes from the housing and is for discharging the exhaust produced by the combustion of the gas and air mixture. The second end may be connected to an exhaust flue which vents the exhaust directly outside of a building. Mounted between the tube and the housing is a reflector which is made of an aluminum sheet buffed on its surface facing the tube. A burner is provided and mounted to the outside of this burner near its downstream end is an electronic ignition element in the form of a glo-bar electrically insulated from the burner.

SUMMARY OF THE PRESENT DISCLOSURE

According to one embodiment of the present invention, a heater assembly adapted for use with a radiant heating tube capable of burning a mixture of combustible gas and air includes an air duct section forming a combustion air passage and having a central longitudinal axis, an inlet end for receiving combustion air, and an opposite outlet end for connection to the radiant heating tube. The air passage extends between the inlet end and the outlet end. The assembly includes a blower having an air inlet and an air outlet and adapted to provide pressurized combustion air to the inlet end of the air duct section. This blower is sealingly connected to the air duct section at the inlet end. A burner assembly is mounted in the air duct section and includes a burner nozzle adapted for connection to a combustible gas supply unit and a burner head for mixing the combustible gas and combustion air to form the mixture for burning in the heating tube. The burner head has an inlet portion with upstream and downstream ends and a substantially cylindrical outlet portion located at the downstream end of the inlet portion. The diameter of the outlet portion is greater than the transverse dimensions of the inlet portion measured perpendicular to the central longitudinal axis. The inlet portion has a plurality of openings distributed around the periphery thereof for passage of combustion air into the burner head. A perforated, flow restricting plate is mounted in the air duct section, extends circumferentially around the burner head, and substantially spans the combustion air passage between the burner head and the air duct section. An array of air holes are distributed over the plate. The assembly includes an igniter adapted for mounting adjacent the burner assembly for igniting the mixture of gas and air. The restricting plate in use allows a substantially laminar air flow downstream of the restricting plate around the circumference of the outlet portion of the burner head and also increases flow of pressurized combustion air through the openings formed in the inlet portion of the burner head.

In a particular version of this heater assembly, the restricting plate is arranged at the downstream end of the inlet portion and the inlet and outlet portions of the burner head are rigidly connected to each other by an annular disk having a plurality of perforations formed therein and extending radially between the downstream end of the inlet portion and an upstream end of the outlet portion.

According to another embodiment of the invention, a radiant tube heater for providing radiant heating includes a tubular arrangement having an air duct portion forming a combustion air passage and a radiant tube portion which is heated by and surrounds a laminar flame during use of the heater and which extends downstream of the air duct portion in relation to the flow of combustion air in the passage. The air duct portion has an inlet at one end thereof for receiving combustion air. The heater includes a blower for providing pressurized combustion air to the inlet of the air duct portion, this blower being sealingly connected to the air duct portion. A burner assembly is mounted in the air duct portion and includes a burner nozzle connectable to a combustible gas supply unit and a burner head for mixing combustible gas delivered by the burner nozzle and the combustion air. The burner head has an inlet portion and an outlet portion which is wider than the inlet portion measured in a direction perpendicular to the flow direction of the combustion air in the passage and which is downstream from the inlet portion. The inlet portion has openings distributed around the periphery thereof for passage of combustion air into the burner head. A perforated restricting plate is mounted within the air duct portion, extends circumferentially around the burner head and between the burner head and the air duct portion. This plate has air holes which are sized and distributed so that, during use of the heater, the plate increases flow of pressurized combustion air through the openings formed in the inlet portion of the burner head while allowing a substantially portion of the combustion air to flow downstream between the outlet portion and the air duct portion. An igniter is mounted adjacent a downstream end of the outlet portion for igniting a mixture of combustible gas and combustion air.

In a particular version of this heater, the restricting plate is annular, has a central hole through which the inlet portion of the burner head extends, and is arranged at a juncture where the inlet portion is connected to the outlet portion of the burner head.

According to another embodiment of the invention, a radiant tube heater for providing radiant heating includes a tubular arrangement having an air duct portion forming a combustion air passage and a radiant tube portion which is heated by and surrounds a laminar flame during use of the heater and which extends downstream of the air duct portion in relation to the flow of combustion air in the passage. The air duct portion has an inlet at one end thereof for receiving combustion air. The heater includes a blower for providing pressurized combustion air to the inlet of the air duct portion, this blower being sealingly connected to the air duct portion. The blower includes a blower fan, a blower casing with an outlet section forming a blower outlet and an attachment mechanism at a downstream end of the outlet section connecting the blower to an upstream end of the tubular arrangement. A burner assembly is mounted in a combined assembly comprising the tubular arrangement and the blower and includes a burner nozzle connectable to a combustible gas supply unit by a gas pipe extending through the side wall of the combined assembly and a burner head for mixing combustible gas delivered by the burner nozzle and the combustion air. The burner head has an inlet portion to which the nozzle in use delivers combustion gas and an outlet portion which is wider than the inlet portion measured in a direction perpendicular to the flow direction of the combustion air in the passage and which is downstream from the inlet portion. The inlet portion has openings in the periphery thereof for passage of the combustion air into the inlet portion. The heater also has an airflow restricting plate mounted in the air duct portion and extending circumferentially around the burner head, this plate increasing flow of pressurized combustion air through the openings formed in the inlet portion of the burner head while allowing a substantial portion of the combustion air to flow downstream between the outlet portion and the air duct portion. There is also provided an igniter having at least an igniting portion thereof mounted within the tubular arrangement for igniting the mixture of combustible gas and combustion air.

In a particular version of this heater, the outlet section of the blower casing has an opening formed in the side thereof for passage of the gas pipe. The burner nozzle is connected to an end of the gas pipe and to the inlet portion of the burner head. The nozzle and the burner head are both positioned centrally in the combustion air passage at the inlet of the air duct portion.

These and other aspects of the disclosed heater assembly and tube heater will become more readily apparent to those having ordinary skill in the art from the following detail description taken in conjunction with the accompanying drawings.

BRIEF DESCRIPTION OF THE DRAWINGS

So that those having ordinary skill in the art to which the present disclosure pertains will more readily understand how to make and use the subject invention, exemplary embodiments thereof will be described in detail herein below with reference to the drawings, wherein:

FIG. 1 is a perspective view of a prior art radiant tube heater in use, this view showing an elongate laminar flame extending from the burner head, the radiant tube being omitted along with its reflector/shield for purposes of clarity and in order to show the flame;

FIG. 2 is a schematic, cross-sectional view of the prior art heater of FIG. 1, this view showing an upstream portion of the radiant tube;

FIG. 6 is another schematic cross-sectional view showing another embodiment of a radiant tube heater according to the present disclosure;

FIG. 7 is a perspective view of the burner head, this view taken from one side and from the upstream end;

FIG. 8 is an axial cross-section of the burner head of FIG. 7;

FIG. 9 is a downstream end view of the burner head;

FIG. 13 is a side elevational view of a combination of the blower of FIG. 11, the burner head and a gas valve unit;

FIG. 14 is a perspective view showing a housing for the radiant tube heater, a reflector/shield extending from the housing and an elongate radiant tube arranged within the reflector/shield;

FIG. 15 is a perspective view showing the housing of FIG. 14 and a portion of the radiant tube extending from one end of the housing; and FIG. 16 is a perspective view of a main portion of the housing with a section of the housing removed to show the blower and gas valve unit.

DETAILED DESCRIPTION OF EXEMPLARY EMBODIMENTS

Figure 3:
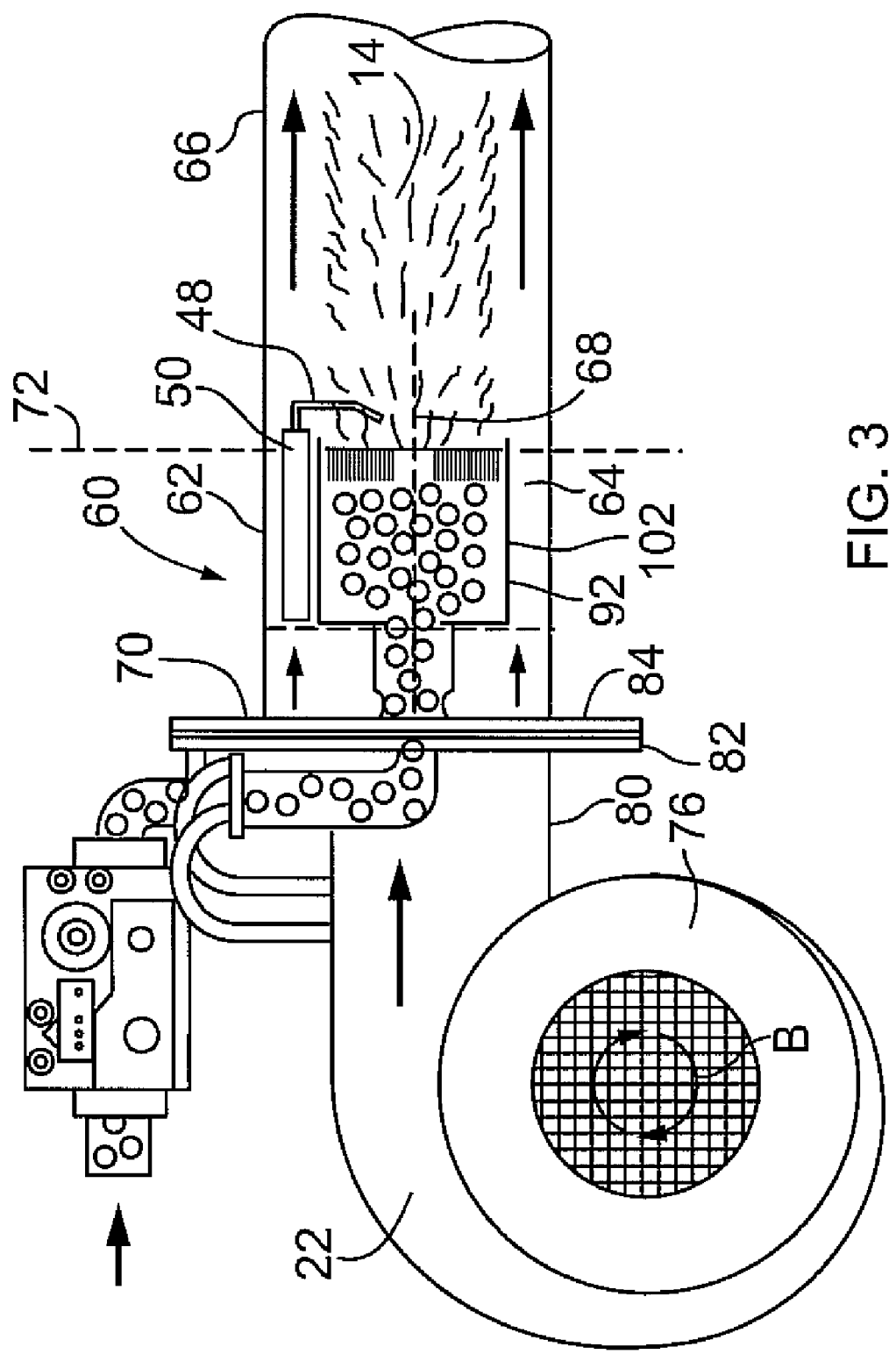
FIG. 3 is a schematic, cross-sectional view similar to FIG. 2 showing one embodiment of a radiant tube heater according to the present disclosure.

In the detailed description which follows exemplary embodiments are described, particularly with reference to the figures appended thereto. However, the particularly described embodiments are merely illustrative of radiant tube heaters and heater assemblies constructed according to the present disclosure.

Referring now to the drawings, wherein like reference numerals identify similar structural elements of the heating units, FIGS. 1 and 2 illustrate schematically the components and arrangement of a prior art radiant tube heater. FIG. 1 shows a housing 10 containing a heater assembly from which extends a radiant heating tube (not shown in FIG. 1 and shown only partially in FIG. 2). The heating tube 12 is elongate and cylindrical and can, if desired, comprise several sections arranged end to end. The length of the heating tube can extend ten feet or more and the tube encloses an elongate flame 14 during use. The tube is heated by the flame and combustion gases to emit infrared radiant heat. Preferably the tube is located within or under a downwardly-opening, trough-shaped reflector/shield (not shown in FIGS. 1 and 2 but similar to that illustrated in FIG. 14). This reflector/shield of the heater receives upwardly-directed radiant energy from the tube and reflects or radiates this energy downwardly to an area or region requiring heating. FIGS. 1 and 2 also illustrate a gas valve governor 16 for the heater which is connected to an air duct section 18 of the heater by gas pipe 20 and a blower or blower fan 22 having a side air inlet 24 into which external air is drawn. The blower has an outlet section which extends tangentially relative to the blower fan and which is connected to an inlet end 28 of the air duct section or housing 18, which has a cylindrical shape. Mounted within the air duct section is a burner assembly which has a central longitudinal axis co-axial with a central longitudinal axis of the air duct section 18. The burner assembly 30 includes a burner nozzle 32 and a burner head 34. The blower, which is external to the duct section and detachably connected thereto by a mounting plate 30, directs combustion air indicated by the arrows A into the air duct section 18 and, as it passes into this duct section, it passes through an equalizer plate 36 having an array of air holes formed therein. The purpose of this plate is to help distribute the combustion air substantially evenly over the transverse cross-section of the air duct section before the combustion air reaches the burner assembly. The burner head 34 is generally annular with a substantially cylindrical inlet portion 38 into which the nozzle extends, a substantially cylindrical outlet portion 40 and a frustoconical, intermediate transition portion 42 extending smoothly between the inlet portion and the outlet portion and connecting same. As shown, the inlet portion 38 has a relatively small diameter compared to the outlet portion which has a relatively large diameter and which is located downstream from the inlet portion.

It will be understood that this known heater is provided with natural gas or LPG fuel indicated by the arrow G taken from a suitable source and delivered through the gas valve governor 16 and the pipe 20 to the upstream end of the inlet portion 38 via the burner nozzle 32. Combustion air enters through vents or ports 44 formed in the cylindrical side wall of the inlet portion and then it intermingles with the fuel to produce a gas/air mixture that exits the burner head through a perforated ceramic tile 46 located at the downstream end of the outlet portion 40. The exiting mixture is ignited by an ionization electrode 48 of an igniter 50 to produce a long laminar flame that extends substantially the length of the radiant heating tube 12. The radiant tube can be connected by means of an end flange 52 to a connecting flange 54 formed on the downstream end of the duct section 18. Bolts and nuts can be used to connect these two flanges.

Figure 11:
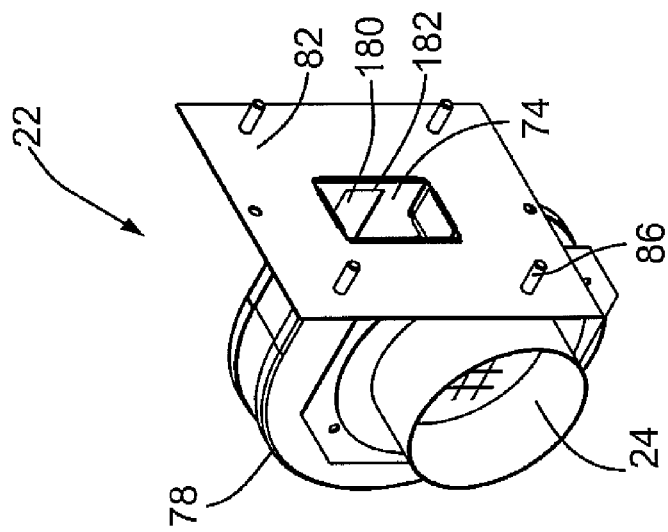
FIG. 11 is a perspective view of the blower of FIG. 10, this view being taken from above and showing a mounting plate for the blower.
Figure 10:
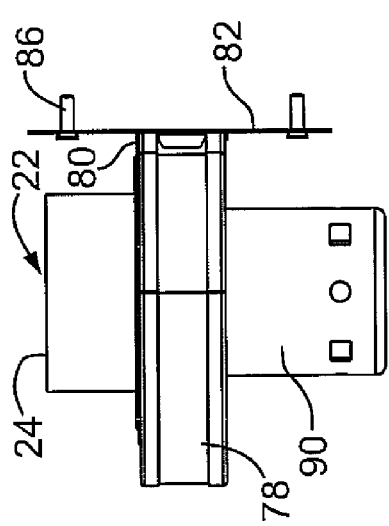
FIG. 10 is a bottom view of a blower usable with the radiant tube heater.
Figure 12:
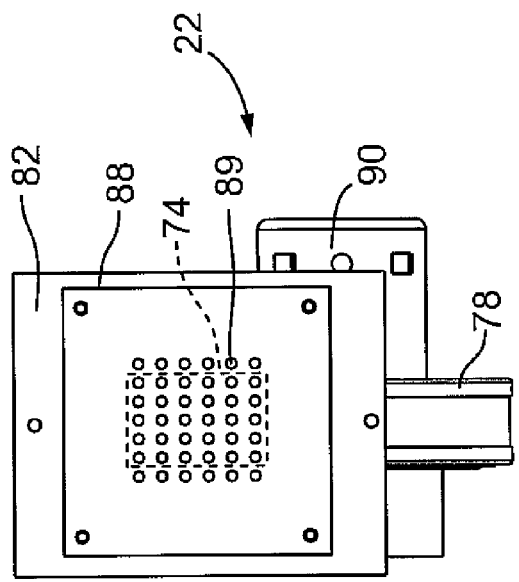
FIG. 12 is an end view of the blower and mounting plate of FIG. 11.

With reference now to FIG. 3 which illustrates one embodiment of a heater assembly 60 constructed according to the invention, this heater assembly is adapted for use with a radiant heating tube capable of containing a burning mixture of combustible gas and air. A preferred material for an upstream section of the radiant tube is stainless steel or aluminized steel. The remaining downstream section can be cold roll steel. A typical dimension for such a heating tube is four inches in diameter and tube sections can be provided in standard lengths of ten feet each. The required number of sections can be connected end to end. Typically two to five such radiant tube sections are connected together to form a complete heating tube which can be connected at the downstream end to a suitable exhaust pipe or passage. The heater assembly includes an air duct section 62 which forms a combustion air passage 64 and which can be integrally connected to and can be part of radiant heating tube 66 as shown in FIGS. 3 and 6 or can be a separate duct section detachably connected to the radiant heating tube (for example, in the manner shown in FIG. 2). The air duct section has a central longitudinal axis indicated at 68 in FIG. 3, an inlet end 70 which is open for receiving combustion air and an opposite outlet end located approximately at the dash line 72 for connection to the radiant heating tube 66. As indicated, this connection can be an integral connection whereby the air duct section is formed from the same cylindrical pipe as the radiant heating tube 66 (if desired). The air passage 64 extends between the inlet end and the outlet end at 72. The heater assembly 60 also includes a blower 22 which can be similar to the blower 22 used in the prior art heater assembly of FIG. 1, except for the differences noted hereinafter. The blower has an air inlet 24 (see FIGS. 10 and 11) and an air outlet 74 which can be rectangular as shown. The blower is adapted to provide pressurized combustion air to the inlet end of the air duct section and it is sealingly connected to the air duct section at this inlet end 70. The blower can include a blower fan of the squirrel cage type, the location of which is indicated by the shaded area at 76 and the direction of rotation of which is indicated by the arrows B in FIG. 3. The blower also includes a metal blower casing 78 having an outlet section 80 forming the blower outlet. Also, an attachment mechanism which can be in the form of a rectangular end plate 82 is attached to the downstream end of the outlet section and is used to connect the blower to the upstream end of the air duct section 62 which is also provided with an end plate 84. The two plates 82, 84 can be connected together by a plurality of bolts 86, four of which are shown in FIG. 11. Nuts (not shown) are threaded onto these bolts in order to connect the two end plates together in a detachable manner. An equalizer plate 88 shown in FIG. 12 having an array of air holes 89 formed therein for the passage of combustion air can be mounted between the two end plates 82, 84 and held in place by the bolts 86. The function of this equalizer plate is to help distribute the combustion air evenly across the height and width of the air duct section 62. The blower is powered by an electric motor 90 which in one embodiment is a 1/35 hp, 120 V 60 Hz motor.

Figure 4:
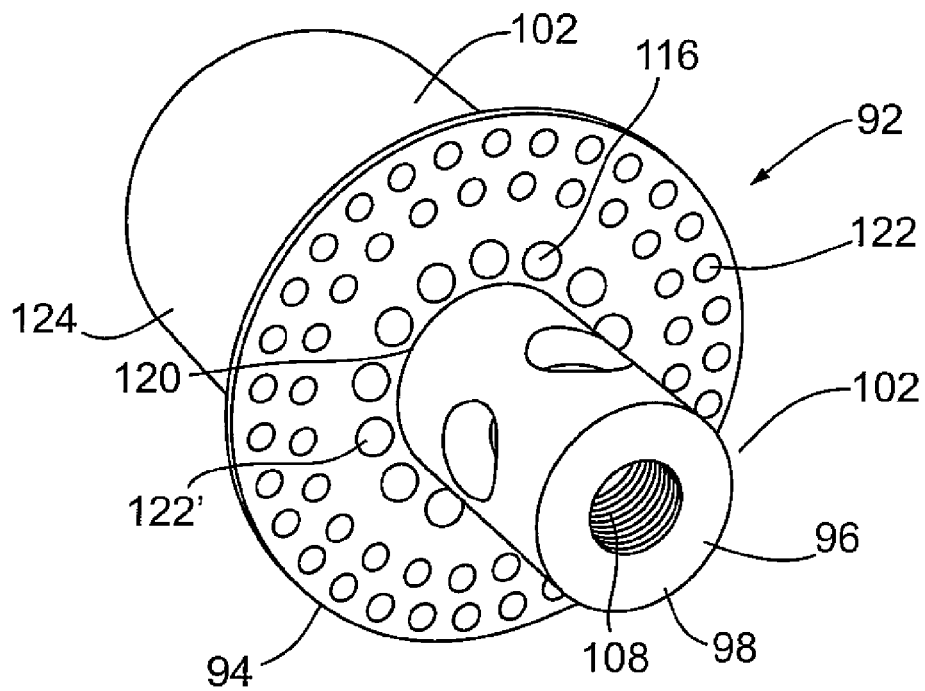
FIG. 4 is a perspective view of a burner head for the heater of FIG. 3, this view showing the head from its upstream end and showing a perforated, flow restricting plate mounted on the burner head.
Figure 5:
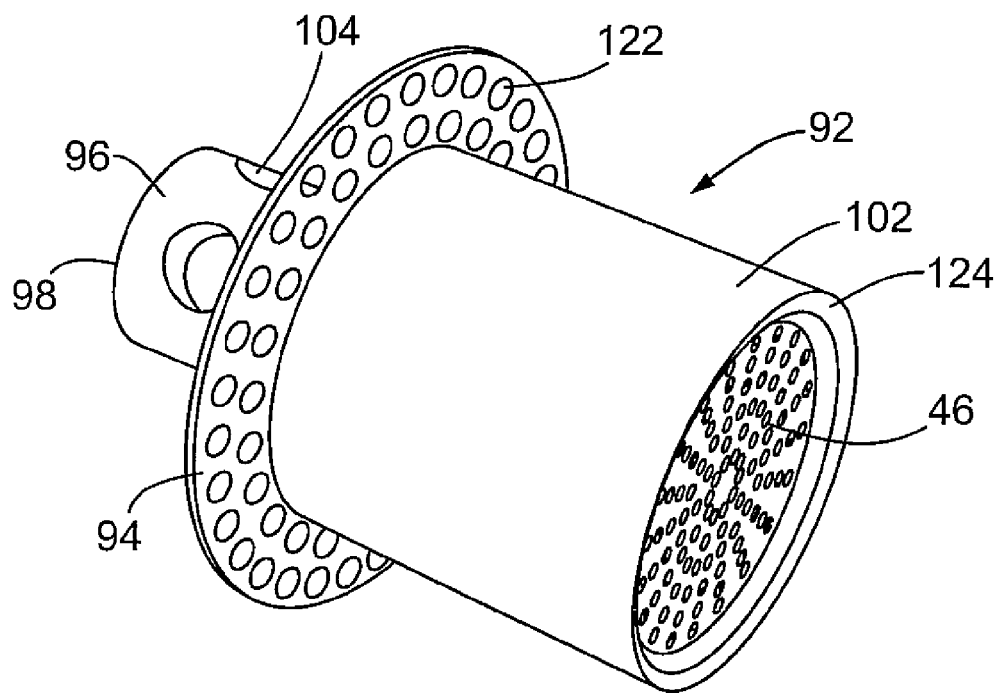
FIG. 5 is a perspective view of the burner head and restricting plate of FIG. 4, this view being taken from one side and from the downstream end.

Turning now to FIGS. 4, 5 and 7 to 9 which illustrate an exemplary embodiment of a burner head 92 for the tube heater, this burner head is shown separately in FIGS. 7 to 9 and is shown with a perforated, flow restricting plate 94 in FIGS. 4 and 5. The illustrated burner head has an inlet portion 96 with an upstream end 98 and a downstream end 100 and a substantially cylindrical outlet portion 102 located at the downstream end of the inlet portion. The diameter of the outlet portion indicated by D in FIG. 8 is greater than, and in an exemplary embodiment substantially greater than, the transverse dimensions of the inlet portion 96, which in the illustrated embodiment has a cylindrical exterior. It will be understood that the diameter D of the outlet portion and the diameter of the inlet portion extend perpendicular to the central longitudinal axis of the air duct section 60 and of the burner head itself. The inlet portion has openings 104 distributed about the periphery thereof for passage of combustion air into the burner head. In the illustrated embodiment, there are four of these openings which are circular and distributed evenly about the circumferences of the inlet portion but there could be fewer or more of these openings provided. These can for example be six of the openings 104. Extending along the longitudinal center line of the inlet portion is an axial passage 106 which is open ended. At the upstream end of this passage, the cylindrical wall of the passage is threaded as shown at 108 in FIG. 7. These threads are used to detachably connect the aforementioned nozzle 32 to the inlet portion. This nozzle is schematically illustrated in FIG. 6 and can be of standard construction per se. The outlet portion 102 is substantially hollow except for the aforementioned perforated ceramic tile 46. This ceramic tile which per se is of known construction has an array of small holes distributed in a radial and circumferential pattern over its surface as shown in FIG. 9. These holes 110 extend parallel to one another and entirely through the thickness of the tile and thus they allow a mixture of combustion air and gas to flow smoothly and evenly out of the burner head with the air and gas mixture distributed across the width and height of the outlet portion. The outlet portion of the burner head is occluded by the ceramic tile which is mounted in the downstream end section of the outlet portion and has a diameter extending perpendicular to the central longitudinal axis of the air duct section. If desired, the tile can be formed with a generally cylindrical center hole which in one embodiment has a diameter of ⅜ths inch. This center hole can be desirable for burners with a low firing input rate and can be omitted in burners with a high firing rate. Although not illustrated in FIGS. 8 and 9, it will be appreciated that the can be held in the end section of the burner head using any one of several possible attachment techniques. For example, the internal circumferential wall of the burner head can be formed with a downstream facing shoulder at 112 to engage and locate one side of the tile. Near the downstream end of the outlet portion there can be formed an internal, circumferential groove to receive a clip such as a flexible metal C-clip that is sized to fit into the groove and to engage and hold the downstream face of the tile. Alternatively, the tile could be formed with radially extending holes in its circumferentially extending edge, these holes adapted to receive short threaded fasteners that extend through the downstream end section of the outlet portion into the tile.

The inlet and outlet portions of the burner head are rigidly and integrally connected to each other by an annular disk or wall 114 having a plurality of apertures 116 formed therein as can be seen in FIG. 7. These apertures or perforations can be arranged in a single circle extending about the circumference of the disk and the disk can be integrally connected to both the inlet portion and the outlet portion, if desired. The disk 114 extends radially between the downstream end of the inlet portion 96 and upstream end 118 of the outlet portion. The arrangement of this disk allows the aforementioned flat restricting plate 94 to be arranged immediately adjacent the outer or downstream side of the disk as shown in FIGS. 4 and 5. Thus, the outer side of the disk or annular wall helps to locate and hold the restricting disk 94 in position. The apertures 116 in the disk allow combustion air to flow from the combustion air passage 64 into the outlet portion 102 during use of the heater. It will be understood that the burner head in the illustrated embodiment is connected to and supported by the burner nozzle 32 but it is possible to support the burner head by other means of support, for example, by securing it to the aforementioned restricting plate 94 and then securing the restricting plate to the air duct section 60 around the circumferential edge of the plate or, alternatively, separate, radially extending support brackets can be provided that extend between and connect to the burner head and the air duct section.

The restricting plate as shown has a circular perimeter and is an annular plate with a central circular hole at 120. The diameter of the hole 120 is slightly greater than the diameter of the inlet portion 96. The restricting plate extends circumferentially around the burner head 92 and substantially spans the combustion air passage 64 between the burner head and the air duct section. The plate is formed with an array of air holes 122 distributed over the plate for the passage of combustion air through the plate. The illustrated restricting plate has three circumferentially extending rows of these holes. The radially innermost holes indicated at 122' can be the same in number and size as the apertures 116 formed in the integral disk 114 of the burner head or the number of holes 122' can be fewer for some burner applications. For example, there can be only four holes 122' evenly distributed around the plate 94 for burners with a firing rate of 130. Thus the plate can be used to restrict airflow into the outlet portion if desired. The holes 122' are aligned with some or all of the perforations 116 so that the combustion air is free to flow through both the holes 122' and some or all of the perforations 116 into the interior of the outlet portion 102 where it mixes with and intermingles with the combustion gas. Two outermost rows of air holes 122 are positioned so that they are beyond the circumferential perimeter of the outlet portion. By means of these two outer rows of holes, the restricting plate in use allows a substantial laminar airflow downstream of the restricting plate around the circumference of the outlet portion 102. Again, depending on the burner performance requirements, the number of holes in these outer rows can be increased or decreased and there may be only one outer row of holes located beyond the circumference of the outlet portion. The plate 94 increases flow of pressurized combustion air through the openings 104 formed in the inlet portion 102. This in turn increases the efficiency of the burner by providing turbulent flow in at least a central region of the outlet portion which improves the mixing of the gas fuel and the combustion air before the mixture exits through the ceramic tile.

It should be noted that it is possible and sometimes desirable to locate the restricting plate 94 downstream from the position shown in FIGS. 4 and 5 and along the exterior of the outlet portion 102. In other words, the restricting plate can be located between a downstream end 100 of the inlet portion and a downstream end 124 of the outlet portion. One such alternative location is indicated by the dash line 126 in FIG. 6. When the restricting plate is in the position shown in FIGS. 4 and 5, it can be secured in this position by a small screw (not shown) extending through a small hole in the plate and extending into the annular disk 114 or the wall of the outlet portion. However, if the restricting plate is located further downstream on the outlet portion, it is possible to secure the plate to the outlet portion in several different ways. For example, the exterior wall of the outlet portion can be formed with a shoulder against which the restricting plate can rest. A short distance from this shoulder an external groove can be formed in the outlet portion to hold a clip, such as a C-clip which secures the restricting plate against the shoulder. The restricting plate can be located at the juncture between the inlet portion and the outlet portion when the radiant heater has a burner with high firing input rates, for example in the range of 130 and 200 BTU/hour. For lower firing input rates, it can be desirable to move the restricting plate further downstream along the exterior of the outlet portion.

The radiant heater assembly is also provided with an igniter 50 for mounting adjacent to the burner assembly for igniting the mixture of combustible gas and air. The igniter has an electrode 48 extending therefrom and projecting in front of the ceramic tile, that is, immediately downstream from the ceramic tile. In the embodiment shown in FIG. 3, the igniter is secured to the side of the burner head. However, in the exemplary embodiment shown in FIG. 6, the igniter is secured to the radiant tube 66 and projects through a hole in the tube. Also shown in FIG. 6 is a mounting plate 130 for mounting the igniter on the wall of the radiant tube so that the igniter projects into the radiant tube portion. The mounting plate can be secured by means of screws extending through the wall of the radiant tube and into holes in the plate.

Shown in FIGS. 14 and 15 is one form of housing 132 in which can be mounted the blower for the radiant heater. The housing is shown in a closed position in FIGS. 14 and 15 and in a swung open position in FIG. 16. The inlet of the blower extends to a side opening 134 in the housing where exterior air is able to flow into the blower. As illustrated, the housing has a rectangular end wall 136 and two opposite side walls 138, 140, both of which are connected to the end wall. Also extending between these side walls is a larger rectangular wall or panel 142. Pivotally attached to the ends of the side walls is an end panel 144 and on this end panel can be mounted the blower. Since the blower outlet is normally attached to the radiant tube or an air duct section extending to the radiant tube, the end plate 144 and attached plate 145 are fixed plates while the blower cover formed by the walls 136 to 142 is pivotal from a closed position (the position shown in FIGS. 14 and 15) to an open position such as that shown in FIG. 16. There can also be attached to the wall 144 a reflector/shield 150, which in use receives upwardly directed radiant energy from the radiant heating tube 66. The reflector/shield can have longitudinally extending side walls 152, 156 and end walls 158, 160, and these walls can be formed with polished, reflecting interior surfaces in order to re-radiate the radiant energy downwardly or towards any desired location. In one embodiment, the reflector/shield is in the form of a trough-shaped channel which is open on the downward side.

Also shown mounted to the interior of the housing 132 are two pressure switches 170, 172 which per se can be of standard construction. These pressure switches are provided to ensure that the blower is in operation and is providing sufficient combustion air to the burner head when the mixture of combustion air and gas is being ignited. These switches are connected by flexible tubes (not shown) to two short connectors 174, 176 mounted on the exterior of the outlet section of the blower (see FIG. 6). The radiant heater is constructed so as to not operate unless sufficient combustion air is being provided to the radiant heater by the blower. Also mounted in the housing against the end wall 136 is a standard electrical controller 190 used to electronically control the operation of the radiant tube heater.

A significant feature of the present improved radiant tube heater is the shortened distance between the blower outlet and the burner head as compared, for example, to the burner arrangement shown in FIG. 2. In particular, as can be seen from FIGS. 3 and 6 the burner nozzle 32 and the burner head 92 are both positioned centrally in the combustion air passage at the inlet of the air duct portion. This is possible because the outlet section of the blower has an opening 180 (see FIG. 11) formed in the side thereof for passage of the gas pipe 20. In one embodiment, the distance between the downstream edge 182 of the opening 180 and the end plate 82 is only about one quarter inch. In the exemplary embodiment shown in FIG. 11, this opening is located in the flat side of the scroll housing which is opposite the air inlet side. This can be compared to the position where the pipe 20 enters the combustion air passage formed by the air duct section 18 in the prior art, a position which is downstream from the blower outlet. As a result of the present repositioning of the nozzle and the burner head relative to the blower outlet, the distance between the blower outlet to the upstream end of the burner head in one exemplary embodiment is reduced by 4 to 5 inches and the size of the heater assembly as a whole, including the blower and the burner head, is reduced by 4 to 5 inches. Not only does this provide a space reduction advantage but, in addition, the amount of the combustion air entering the burner head both through the openings 104 and through the openings or perforations 116 is effectively increased, which in turn increases the turbulence or mixing effect in the burner cup or outlet portion 102.

With the housing 132 constructed in the manner shown in FIGS. 15 and 16, it is possible to open up the cover of the housing while the burner is still in operation in order to allow servicing. In an alternative version of the housing not shown, the cover portion can be completely removed from the main portion of the housing instead of being pivotally connected thereto.

The radiant tube heater described herein has been tested and compared to prior art tube heaters such as that shown in FIG. 2. The present tube heater has been shown to have a radiant efficiency of 62% which means that 62% of the total heat energy emitted is in the form of radiant energy. The remaining heat energy is convection energy which tends to be less useful in areas where radiant tube heaters are employed. This compares very favourably to the prior art heaters which had a radiant efficiency of around 50%. Also, these tests revealed a combustion efficiency of the present heaters of 78.8% significantly better than prior art heaters which had only a 72% combustion efficiency.

It will be appreciated by those skilled in the construction of radiant tube heaters that such a heater provided with the above described perforated, flow restricting plate can provide improved burner efficiency, while providing a substantially laminate flow downstream of the plate, this flow being substantially uniform across the air duct section/radiant heating tube combination. In addition, in a particularly exemplary embodiment, by reducing the distance between the blower fan and the burner inlet, the efficiency of the burner can be further enhanced.

While the present invention has been illustrated and described as embodied in certain exemplary embodiments, i.e. embodiments having particular burning efficiency, it is to be understood that the present invention is not limited to the details shown herein, since it will be understood that various omissions, modifications, substitutions and changes in the form and details of the disclosed heater assemblies and radiant tube heaters can be made by those skilled in the art without departing in any way from the spirit and scope of the present invention. For example, those with ordinary skill in the art will readily adapt the present disclosure for various other applications without departing from the spirit or scope of the present invention.

The invention claimed is:

1. A heater assembly adapted for use with a radiant heating tube capable of burning a mixture of combustible gas and air, the heater assembly comprising:
    an air duct section forming a combustion air passage and having a central longitudinal axis, an inlet end for receiving combustion air, and an opposite outlet end for connection to said radiant heating tube, said passage extending between said inlet end and said outlet end;
    a blower having an air inlet and an air outlet and adapted to provide pressurized combustion air to said inlet end of the air duct section, said blower being sealingly connected to said air duct section at said inlet end;
    a burner assembly mounted in said air duct section and including a burner nozzle adapted for connection to a combustible gas supply unit and a burner head for mixing said combustible gas and combustion air to form said mixture for burning in said heating tube, said burner head having an inlet portion with upstream and downstream ends and a substantially cylindrical outlet portion located at said downstream end of the inlet portion, the diameter of said outlet portion being greater than the transverse dimensions of said inlet portion measured perpendicular to said central longitudinal axis, said inlet and outlet portions being rigidly connected to each other by an annular disk having a plurality of perforations formed therein and extending radially between said downstream end of said inlet portion and an upstream end of the outlet portion, said perforations allowing combustion air to flow from the combustion air passage into said outlet portion during use of the heater assembly, said inlet portion having openings distributed around the periphery thereof for passage of combustion air into said burner head;
    a perforated, flow restricting plate mounted in said air duct section, extending circumferentially around said burner head and substantially spanning said combustion air passage between said burner head and said air duct section, said plate having an array of air holes distributed over the plate; and
    an igniter adapted for mounting adjacent said burner assembly for igniting said mixture of combustible gas and air,
    wherein said restricting plate in use allows a substantially laminar air flow downstream of the restricting plate around the circumference of the outlet portion of the burner head and increases flow of pressurized combustion air through said openings formed in the inlet portion of the burner head.

2. A heater assembly according to claim 1 wherein said restricting plate is arranged at said downstream end of the inlet portion.

3. A heater assembly according to claim 2 in combination with said radiant heating tube which is an integral extension of said air duct section.

4. A heater assembly according to claim 2 wherein said restricting plate is mounted adjacent said annular disk and a portion of said air holes in said restricting plate are aligned with holes formed in said annular disk, thereby allowing combustion air to flow into said outlet portion through the aligned holes.

5. A radiant tube heater for providing radiant heating, said heater comprising:
    a tubular arrangement including a cylindrical air duct portion forming a combustion air passage and a radiant tube portion which is heated by and surrounds a laminar flame during use of said heater and which extends downstream of and is axially aligned with said air duct portion in relation to the flow of combustion air in said passage, said air duct portion having an inlet at one end thereof for receiving combustion air and having an outlet connected to an end of said radiant tube portion;
    a blower for providing pressurized combustion air to said inlet of said air duct portion, said blower being sealingly connected to said inlet of the air duct portion;
    a burner assembly mounted in said air duct portion and including a burner nozzle connectable to a combustible gas supply unit and a burner head for mixing combustible gas delivered by the burner nozzle and said combustion air, said burner head having an inlet portion with a cylindrical side wall and a substantially cylindrical outlet portion having a diameter wider than said inlet portion measured in a direction perpendicular to the flow direction of said combustion air in said passage and which is downstream from said inlet portion, said inlet portion having openings distributed around the periphery of its cylindrical side wall for passage of combustion air into said burner head, said inlet and outlet portions of the burner head being rigidly connected to each other by an annular disk having a plurality of perforations formed therein and extending radially between said downstream end of the inlet portion and an upstream end of the outlet portion, said perforations in the disk allowing combustion air to flow from the combustion air passage into said outlet portion during use of the heater;
    a perforated restricting plate mounted within said air duct portion, extending circumferentially around said burner head and between said burner head and said air duct portion, said plate being located on said burner head at a juncture where said inlet portion is connected to the outlet portion or between a downstream end of the inlet portion and a downstream end of the outlet portion and having air holes which are sized and distributed so that, during use of said heater, the plate increases flow of pressurized combustion air through said openings formed in the inlet portion of the burner head while allowing a substantial portion of the combustion air to flow downstream between the outlet portion and the air duct portion; and
    an igniter mounted adjacent a downstream end of the outlet portion for igniting the mixture of combustible gas and combustion air,
    wherein said restricting plate is annular, has a central hole through which the inlet portion of the burner head extends, and is arranged at said juncture where said inlet portion is connected to the outlet portion of the burner head.

6. A heater according to claim 5 wherein said igniter has a mounting plate for mounting the igniter on a wall of said radiant tube portion so that the igniter projects into the radiant tube portion and wherein said burner head includes a perforated ceramic tile mounted at the downstream end of the outlet portion and within the outlet portion.

7. A radiant tube heater for providing radiant heating, said heater comprising:

a tubular arrangement including a cylindrical air duct portion forming a combustion air passage and a radiant tube portion which is heated by and surrounds a laminar flame during use of said heater and which extends downstream of said air duct portion in relation to the flow of combustion air in said passage, said air duct portion having an inlet at one end thereof for receiving combustion air;

a blower for providing pressurized combustion air to said inlet of said air duct portion, said blower being sealingly connected to said inlet of the air duct portion, said blower including a blower fan, a blower casing with an outlet section forming a blower outlet, and an attachment mechanism at a downstream end of said outlet section connecting said blower to an upstream end of the tubular arrangement;

a burner assembly mounted in a combined assembly comprising said tubular arrangement and said blower, said burner assembly including a burner nozzle connectable to a combustible gas supply unit by a gas pipe extending through a sidewall of the combined assembly and a burner head for mixing combustible gas delivered by the burner nozzle and said combustion air, said burner head having an inlet portion to which said nozzle in use delivers combustion gas and a substantially cylindrical outlet portion which is wider than said inlet portion measured in a direction perpendicular to the flow direction of said combustion air in said passage and which is downstream from said inlet portion, said inlet portion having a cylindrical side wall and having openings in its cylindrical side wall for passage of combustion air into said inlet portion;

an airflow restricting plate mounted in said air duct portion and extending circumferentially around said burner head, said plate being located on said burner head either at a juncture where said inlet portion is connected to the outlet portion or between a downstream end of the inlet portion and a downstream end of the outlet portion and said plate increasing flow of pressurized combustion air through said openings formed in the inlet portion of the burner head while allowing a substantial portion of the combustion air to flow downstream in an annular passage formed between the outlet portion and the air duct portion; and an igniter having at least an igniting portion thereof mounted within said tubular arrangement for igniting the mixture of combustible gas and combustion air, wherein said outlet section of the blower casing has an opening formed in a side thereof for passage of said gas pipe and said burner nozzle is connected to an end of said gas pipe and to said inlet portion of said burner head, said burner nozzle and burner head both being positioned centrally in said combustion air passage at the inlet of said air duct portion.

8. A tube heater according to claim 7 wherein said restricting plate is arranged at the downstream end of the inlet portion and is formed with an array of air holes which are distributed around the periphery of the inlet portion, said restricting plate in use allowing a substantially laminar air flow downstream of the restricting plate in said annular passage.

9. A tube heater according to claim 8 wherein said inlet and outlet portions of the burner head are rigidly connected to each other by a perforated annular disk extending radially between said downstream end of the inlet portion and an upstream end of the outlet portion, and wherein said restricting plate is mounted adjacent said annular disk and a portion of said air holes in said restricting plate are aligned with holes formed in said annular disk, thereby allowing combustion air to flow into said outlet portion through the aligned holes.

10. A tube heater according to claim 7 wherein said restricting plate is annular, extends radially between said outlet portion and said air duct portion, and is located between the downstream end of the inlet portion and the downstream end of the outlet portion.

11. A tube heater according to claim 7 wherein said burner head has a central longitudinal axis which is substantially coaxial with a central longitudinal axis of said tubular arrangement and an upstream end of said inlet portion is arranged approximately at said inlet of said air duct portion.

12. A tube heater according to claim 7 wherein said outlet portion is occluded by a perforated ceramic-tile mounted in a downstream end section of said outlet portion and said igniter is mounted close to and downstream of said ceramic tile.

13. A radiant tube heater for providing radiant heating, said heater comprising:

a tubular arrangement including an air duct portion forming a combustion air passage and a radiant tube portion which is heated by and surrounds a laminar flame during use of said heater and which extends downstream of said air duct portion in relation to the flow of combustion air in said passage, said air duct portion having an inlet at one end thereof for receiving combustion air;

a blower for providing pressurized combustion air to said inlet of said air duct portion, said blower being sealingly connected to said air duct portion, said blower including a blower fan, a blower casing with an outlet section forming a blower outlet, and an attachment mechanism at a downstream end of said outlet section connecting said blower to an upstream end of the tubular arrangement, said outlet section having an opening formed in a side thereof;

a gas pipe for providing combustible gas under pressure for burning in said radiant tube portion, said gas pipe extending through said opening;

a burner assembly mounted in said combustion air passage, said burner assembly being connected to an end of said gas pipe and adapted to mix said combustible gas with said combustion air; and an igniter having at least an igniting portion thereof mounted within said tubular arrangement for igniting the mixture of combustible gas and combustion air;

wherein an upstream end of said burner assembly is adjacent said upstream end of the tubular arrangement.

14. A radiant tube heater according to claim 13 including an airflow restricting plate mounted in said air duct portion and extending circumferentially around said burner assembly which includes a burner head having an inlet portion, said plate increasing flow of said combustion air through openings found in said inlet portion.

15. A radiant tube heater according to claim 14 including two tube connectors mounted on said outlet section of said blower and adapted for connection to respective pressure switches which, during operation of said tube heater, ensure that the blower is operating and providing sufficient combustion air to said burner head for ignition of said mixture of combustible gas and combustion air.

16. A radiant tube heater according to claim 13 wherein said burner assembly includes a burner nozzle and a burner head connected to said burner nozzle, said burner nozzle is connected to said end of the gas pipe, and said burner nozzle and said burner head are positioned centrally in said combustion air passage of said air duct portion.

17. A radiant tube heater according to claim 16 wherein said attachment mechanism of the blower is an end plate and said opening in the outlet section is about one quarter inch from said end plate.

18. A radiant tube heater according to claim 16 wherein said burner head has an inlet portion to which said burner nozzle is connected and a substantially cylindrical outlet portion which is wider than said inlet portion in a direction perpendicular to the flow direction of said combustion air in said passage, said inlet portion has a cylindrical side wall and has openings in its cylindrical side wall for passage of combustion air into said inlet portion, and an upstream end of said inlet portion is located approximately at said inlet of said air duct portion.

* * * * *